United States Patent
Grawrock et al.

(10) Patent No.: US 9,721,100 B2
(45) Date of Patent: Aug. 1, 2017

(54) TECHNOLOGIES FOR PROTECTED HARDWARE FUNCTION MONITORING AND FORENSICS

(71) Applicant: Intel Corporation, Santa Clara, CA (US)

(72) Inventors: David W. Grawrock, Aloha, OR (US); Sarat Kompalli, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 14/317,595

(22) Filed: Jun. 27, 2014

(65) Prior Publication Data

US 2015/0379269 A1 Dec. 31, 2015

(51) Int. Cl.
*G06F 21/57* (2013.01)
*G06F 21/71* (2013.01)

(52) U.S. Cl.
CPC .............. *G06F 21/57* (2013.01); *G06F 21/71* (2013.01)

(58) Field of Classification Search
CPC .......... G06F 21/57; G06F 21/86; G06F 21/75; G06F 2221/034; H01L 23/576
See application file for complete search history.

(56) References Cited

U.S. PATENT DOCUMENTS

| | | | |
|---|---|---|---|
| 6,678,833 B1* | 1/2004 | Grawrock | G06F 9/4401 713/1 |
| 7,089,595 B1* | 8/2006 | Grawrock | G06F 21/88 713/300 |
| 8,379,861 B2* | 2/2013 | Akselrod | G01R 31/31719 380/277 |
| 2002/0087877 A1* | 7/2002 | Grawrock | G06F 21/575 726/26 |
| 2003/0061494 A1* | 3/2003 | Girard | G06F 21/57 713/189 |
| 2004/0178278 A1* | 9/2004 | Fruhauf | G06K 7/10297 235/492 |

(Continued)

OTHER PUBLICATIONS

Ruiz et al., "A Security-focused Engineering Process for Systems of Embedded Components", Published Sep. 2011, SD4RCES, Retrieved from http://dl.acm.org/citation.cfm?doid=2349913.2349917.*

*Primary Examiner* — Chau Le
(74) *Attorney, Agent, or Firm* — Barnes & Thornburg LLP

(57) ABSTRACT

Technologies for monitoring protected functionality of an integrated circuit device include an integrated circuit device having a protected function module. The protected function module includes a modifiable security device. When the protected function module is activated or powered up, an attribute of the modifiable security device is irreversibly modified. The integrated circuit device may be a processor, and the protected function module may be a debug module of the processor. The modifiable circuit device may be an oscillator. The frequency of the oscillator may change when the oscillator is powered due to oscillator aging. The integrated circuit device may be included in a computing device. The integrated circuit device may expose data indicative of the attribute of the modifiable security device to firmware or software of the computing device. The data may be exposed through a cryptographically signed, firmware-readable memory space. Other embodiments are described and claimed.

23 Claims, 3 Drawing Sheets

(56) References Cited

U.S. PATENT DOCUMENTS

| | | | |
|---|---|---|---|
| 2005/0091520 A1* | 4/2005 | Khan | G06F 11/3648 |
| | | | 713/194 |
| 2005/0273623 A1* | 12/2005 | Huang | G06K 19/07345 |
| | | | 713/183 |
| 2007/0118880 A1* | 5/2007 | Mauro, II | G06F 21/79 |
| | | | 726/4 |
| 2008/0018356 A1* | 1/2008 | Anand | G01R 31/31723 |
| | | | 324/762.02 |
| 2008/0111682 A1* | 5/2008 | Diluoffo | G06F 21/75 |
| | | | 340/540 |
| 2009/0309745 A1* | 12/2009 | Johnson | G06F 1/28 |
| | | | 340/635 |
| 2010/0187525 A1* | 7/2010 | Bartley | G06F 21/75 |
| | | | 257/48 |
| 2010/0199077 A1* | 8/2010 | Case | G06F 11/3656 |
| | | | 713/1 |
| 2010/0213951 A1* | 8/2010 | Lewis | H01L 23/576 |
| | | | 324/649 |
| 2013/0141137 A1* | 6/2013 | Krutzik | H03K 19/173 |
| | | | 326/8 |

\* cited by examiner

TECHNOLOGIES FOR PROTECTED HARDWARE FUNCTION MONITORING AND FORENSICS

BACKGROUND

Integrated circuit devices such as processors, chipsets, or other computer silicon chips typically include debug functionality intended for use during manufacturing or testing. However, if used in production, the debug functionality may present privacy or security concerns. For example, debug functionality may expose sensitive information, allow execution of malicious code, or otherwise result in unexpected operation of the integrated circuit device.

Many integrated circuit devices therefore password-protect or otherwise control entry into debug mode. Additionally, some integrated circuit devices may include debug indicators, which typically monitor entry points into debug mode and indicate whether debug mode has been entered. Typical debug indicators are stored in volatile memory or are otherwise not available across cold reboots or other power cycles. Additionally, some debug indicators may be bypassed by malicious code using a non-monitored entry point to debug mode.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
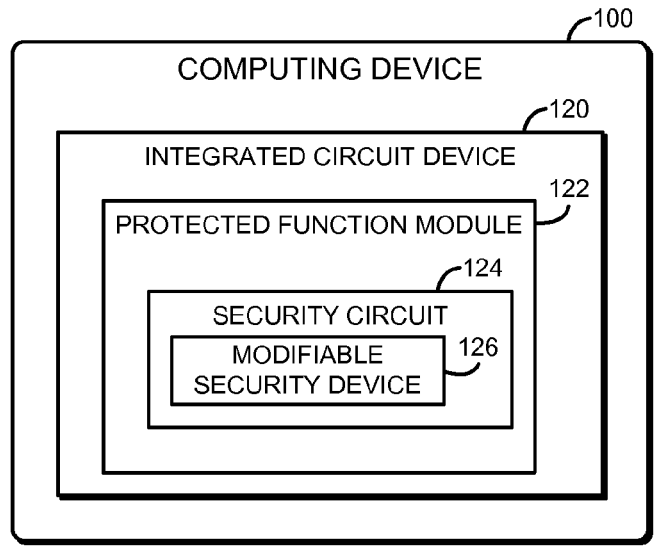
FIG. 1 is a simplified block diagram of at least one embodiment of a computing device for protected function monitoring.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

Some portions of the disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for protected function monitoring includes an integrated circuit device 120 having a protected function module 122. In use, as described further below, the protected function module 122 may provide functionality to the integrated circuit device 120 and/or the computing device 100 that may affect security, data privacy, or otherwise provide sensitive functionality. Therefore, the protected function module 122 may be typically disabled or otherwise inactive. Whenever the protected function module 122 is active, a security circuit 124 may initiate an irreversible modification, alteration, or other change to one or more attributes of a modifiable security device 126 of the protected function module 122. For example, as described further below, the security circuit 124 may power up an oscillator, causing the oscillator circuitry to irreversibly change due to oscillator aging. The state of the modifiable security device 126 may be read to determine whether the protected function module 122 has been activated. Therefore, by modifying the state of a hardware modifiable security device 126, information concerning whether the protected function module 122 is active may survive cold reboots or other power cycles of the computing device 100. Additionally, modification of the modifiable security device 126 is caused by the protected function module 122 being active and not through monitoring of entry into debug mode. Therefore, modification of the modifiable security device 126 may not be easily circumvented by malicious actors. Accordingly, information on whether the protected function module 122 was executed may be used for computer forensics purposes, even after the computing device 100 has experienced one or more power cycles.

The computing device 100 may be embodied as any type of device for performing the functions described herein. For example, the computing device 100 may be embodied as, without limitation, a smartphone, a tablet computer, a laptop computer, a notebook computer, a mobile computing device, a wearable computing device, a cellular telephone, a handset, a messaging device, a vehicle telematics device, a server computer, a desktop computer, a workstation, a distributed computing system, a multiprocessor system, a consumer electronic device, and/or any other computing device configured to perform the functions described herein. The illustrative computing device 100 includes an integrated circuit device 120. Of course, the computing device 100 may include other or additional components, such as those commonly found in a computer (e.g., a processor, memory, various input/output devices), in other embodiments.

The integrated circuit device 120 may be embodied as any type of integrated circuit, computer chip, or other circuit component of the computing device 100. For example, the integrated circuit device 120 may be embodied as a processor, chipset, I/O subsystem, embedded controller, memory device, or other component of the computing device 100. In some embodiments, the integrated circuit device 120 may be embodied as multiple integrated circuits included in a single package. The integrated circuit device 120 may include one or more subsystems, sub-circuits, functional blocks, or other modules that each provide functionality to the integrated circuit device 120 and/or the computing device 100. In many embodiments, each subsystem may occupy a particular physical location on the integrated circuit die of the integrated circuit device 120. The illustrative integrated circuit device 120 includes a protected function module 122.

The protected function module 122 may be embodied as any circuit, collection of circuits, subsystem, sub-circuit, functional block, or other module of the integrated circuit device 120 that provides functionality that should be monitored, restricted, and/or otherwise protected from general use. In many embodiments, the protected function module 122 may provide functionality that, if misused, may adversely impact the security of the computing device 100, the privacy of data processed by the computing device 100, or other sensitive functionality. For example, the protected function module 122 may provide debug functionality such as run control or tracing. As another example, the protected function module 122 may provide metering or billing functionality that should not be activated or accessed by an end user, such as for an embedded integrated circuit device 120 (e.g., an "Internet of Things" application). To reduce power consumption and/or improve security, the protected function module 122 maybe be power-gated or otherwise powered down when inactive. The protected function module 122 includes a security circuit 124 that includes or otherwise controls a modifiable security device 126.

The modifiable security device 126 may be embodied as any circuit, component, or other device that may be irreversibly modified or otherwise altered by the integrated circuit device 120. Modifications to the modifiable security device 126 are persistent across power cycles and may not be reversed by software or firmware executed or hosted by the computing device 100. In other words, the modifiable security device 126 may expose one or more attributes that may be irreversibly changed, with the changes to those attributes persistent across power cycles. For example, the modifiable security device 126 may be embodied as any device associated with a rate of decay when the device is used. In many embodiments, the modifiable security device 126 may be embodied as a crystal oscillator. Additionally or alternatively, the modifiable security device 126 may be embodied as one or more fuses or as a potentially leaky circuit component such as a capacitor.

The security circuit 124 may be embodied as any control circuit, interconnect, or other component that causes the modifiable security device 126 to be modified in response to activation of the protected function module 122. For example, in many embodiments, the protected function module 122 may be powered up when active. In those embodiments, the security circuit 124 may also supply power to the modifiable security device 126, causing modification of the modifiable security device 126.

Figure 2:
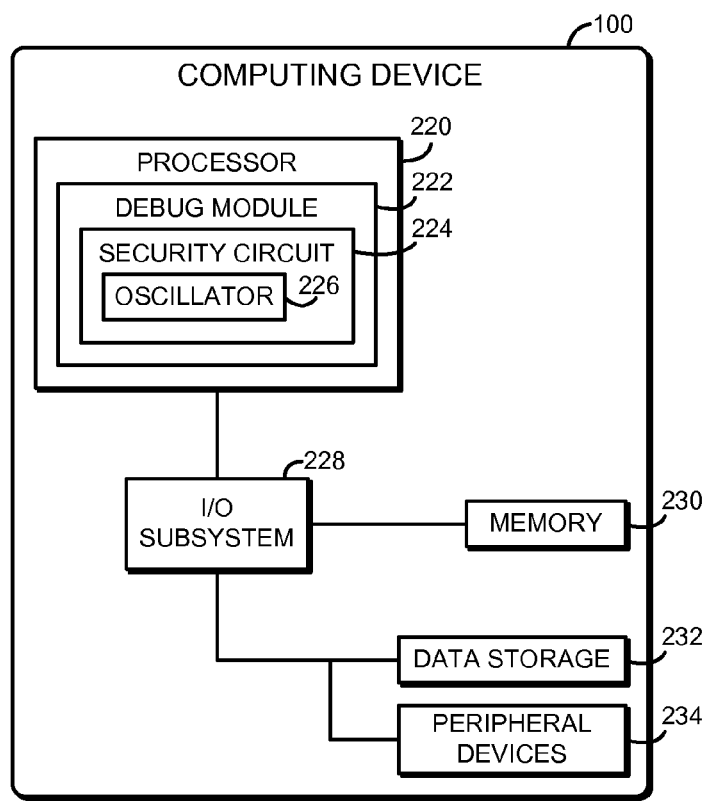
FIG. 2 is a simplified block diagram of another embodiment of a computing device for protected function monitoring.

Referring now to FIG. 2, another illustrative computing device 100 for protected function monitoring is shown. As described above, the computing device 100 may be embodied as any type of device for performing the functions described herein. For example, the computing device 100 may be embodied as, without limitation, a smartphone, a tablet computer, a laptop computer, a notebook computer, a mobile computing device, a wearable computing device, a cellular telephone, a handset, a messaging device, a vehicle telematics device, a server computer, a desktop computer, a workstation, a distributed computing system, a multiprocessor system, a consumer electronic device, and/or any other computing device configured to perform the functions described herein. The illustrative computing device 100 includes a processor 220, an input/output subsystem 228, a memory 230, and a data storage device 232. Of course, the computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 230, or portions thereof, may be incorporated in the processor 220 in some embodiments.

The processor 220 may be embodied as any type of processor capable of performing the functions described herein. For example, the processor 220 may be embodied as a single or multi-core processor(s), digital signal processor, microcontroller, or other processor or processing/controlling circuit. The processor 220 corresponds to the integrated circuit device 120 described above in connection with FIG. 1. Accordingly, the processor 220 includes a debug module 222 corresponding to the protected function module 122. The debug module 222 may be embodied as any subsystem, sub-circuit, or functional block of the processor 220 that provides debug functionality, such as run control or tracing. The processor 220 may include the debug module 222 primarily for design, manufacturing, and testing purposes. Thus, in production systems the debug module 222 may be normally inactive and/or powered-down. In some embodiments, the debug module 222 may be activated by writing to a particular register, memory address, or other storage location of the processor 220, such as an IA-32 debug interface model-specific register (MSR).

The debug module 222 includes a security circuit 224 corresponding to the security circuit 124. The security circuit 224 includes a crystal oscillator 226 corresponding to the modifiable security device 126. When powered, the oscillator 226 produces an oscillating voltage signal at a particular operating frequency (e.g., the resonant frequency, a multiple of the resonant frequency, or an overtone). Over time, as the oscillator 226 operates, the operating frequency changes, which is a result of a phenomenon known as oscillator aging. During manufacturing and/or testing, the oscillator 226 may be operated, for example to monitor device burn-in. After manufacturing is complete and the processor 220 is delivered to a customer, the oscillator 226 may be powered down. Thus, any changes to the operating frequency of the oscillator 226 may indicate that the oscillator 226 has been powered on since being delivered to the customer. Additionally or alternatively, in some embodiments a flooring circuit may be used to floor the output of the oscillator 226 after the frequency has drifted by a threshold amount. Thus, rather than gradually changing the operating frequency of the oscillator, when an oscillator used with a flooring circuit has sufficiently aged, the oscillator may no longer operate at all.

The security circuit 224 may be embodied as an interconnect connecting the power supplies of the debug module 222 and the oscillator 226. Thus, whenever the debug module 222 is powered up, the oscillator 226 may also be powered up. Thus, changes to the frequency of the oscillator 226 may also indicate that the debug module 222 has been powered up after the processor 220 was delivered to the customer. By connecting the power supply of the oscillator 226 to the power supply of the debug module 222 at the hardware level, operation of the oscillator 226 during operation of the debug module 222 may not be circumvented by firmware or software of the computing device 100.

The memory 230 may be embodied as any type of volatile or non-volatile memory or data storage capable of performing the functions described herein. In operation, the memory 230 may store various data and software used during operation of the computing device 100 such as operating systems, applications, programs, libraries, and drivers. The memory 230 is communicatively coupled to the processor 220 via the I/O subsystem 228, which may be embodied as circuitry and/or components to facilitate input/output operations with the processor 220, the memory 230, and other components of the computing device 100. For example, the I/O subsystem 228 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 228 may form a portion of a system-on-a-chip (SoC) and be incorporated, along with the processor 220, the memory 230, and other components of the computing device 100, on a single integrated circuit chip.

The data storage device 232 may be embodied as any type of device or devices configured for short-term or long-term storage of data such as, for example, memory devices and circuits, memory cards, hard disk drives, solid-state drives, or other data storage devices. In some embodiments, the computing device 100 may also include one or more peripheral devices 234. The peripheral devices 234 may include any number of additional input/output devices, interface devices, and/or other peripheral devices. For example, in some embodiments, the peripheral devices 234 may include a display, touch screen, graphics circuitry, keyboard, mouse, speaker system, and/or other input/output devices, interface devices, and/or peripheral devices.

Figure 3:
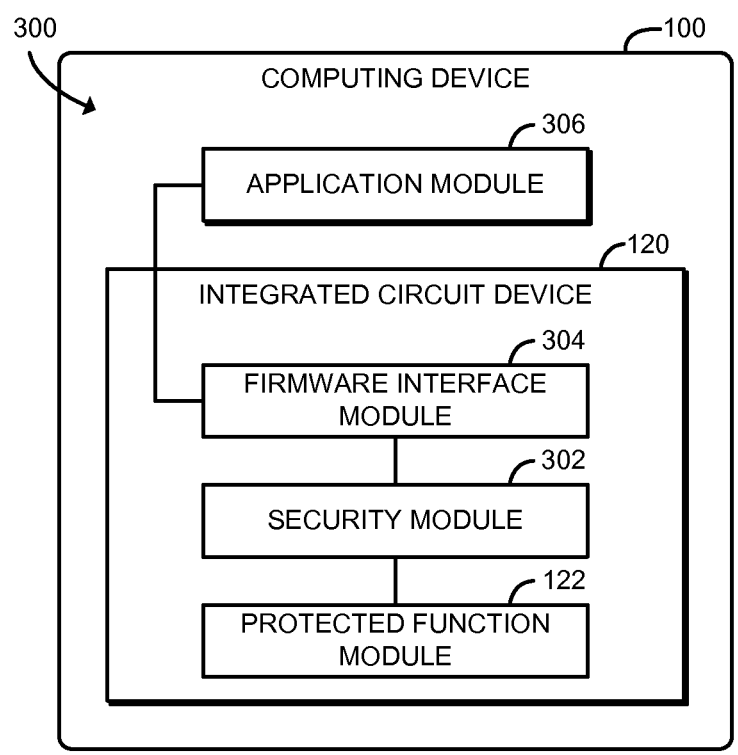
FIG. 3 is a simplified block diagram of at least one embodiment of an environment of the computing device of FIG. 1.

Referring now to FIG. 3, in some embodiments the computing device 100 establishes an environment 300 during operation. The illustrative environment 300 includes a security module 302, a firmware interface module 304, and an application module 306. The various modules of the environment 300 may be embodied as hardware, firmware, software, or a combination thereof. In particular, the security module 302 and the firmware interface module 304 may be established by hardware and/or firmware of the integrated circuit device 120.

The security module 302 is configured to irreversibly modify the modifiable security device 126 when the protected function module 122 is activated. Depending on the modifiable security device 126 in use, the security module 302 may power up an oscillator 126, blow a fuse 126, power up a circuit component 126 to cause leakage current of the component to increase, or otherwise irreversibly modify an attribute of the modifiable security device 126. The security module 302 may also detect or otherwise determine whether the protected function module 122 activated, for example using the security circuit 124.

The firmware interface module 304 is configured to read the status of the modifiable security device 126 and return data indicative of the status. The status of the modifiable security device 126 may indicate whether the modifiable security device 126 has been irreversibly modified in response to activation of the protected function module 122. The firmware interface module 304 may establish a firmware-readable memory space that includes the data indicative of the status of the modifiable security device 126. In some embodiments, the firmware interface module 304 may cryptographically sign the data indicative of the status of the modifiable security device 126.

The application module 306 may be embodied as any application code, device driver code, or operating system code that may be executed by the computing device 100. The application module 306 may request the status of the modifiable security device 126, for example by reading a memory space established by the firmware interface module 304, and use the data returned to determine whether the modifiable security device 126 has changed and thus whether the protected function module 122 has been activated. In some embodiments, the application module 306 may maintain device logs or other historical data to monitor for changes over time. The application module 306 may be embodied as, for example, a computer forensics application that may be used to determine whether debug functionality of the computing device 100 has been activated.

Figure 4:
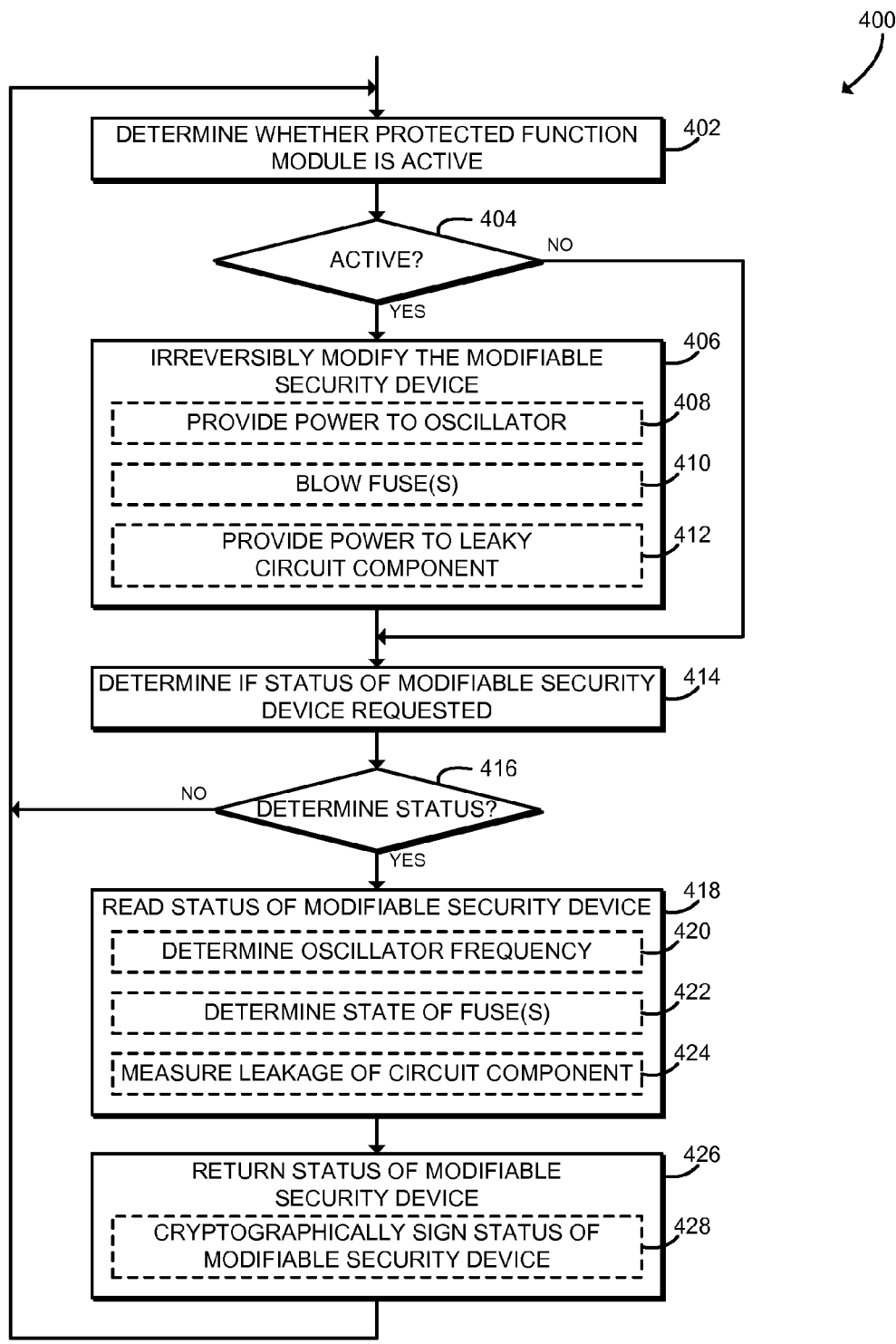
FIG. 4 is a simplified flow diagram of at least one embodiment of a method for protected function monitoring that may be executed by the computing device of FIGS. 1 and 2.

Referring now to FIG. 4, in use, the computing device 100 may execute a method 400 for protected function monitoring. The method 400 begins in block 402, in which the computing device 100 determines whether the protected function module 122 is active. The computing device 100 may use any technique to determine whether the protected function module 122 is active. For example, in some embodiments the computing device 100 may use dedicated hardware of the integrated circuit device 120 to determine whether the protected function module 122 is active. Continuing that example, in some embodiments the protected function module 122 may be supplied with power when active, and the security circuit 124 may automatically detect that the protected function module 122 is active based on the supplied power. As another example, in some embodiments the computing device 100 may monitor, check, or otherwise reference a register, memory address, or other storage location to determine whether the protected function module 122 is active. Continuing that example, in some embodiments, the computing device 100 may monitor an IA-32 debug interface model-specific register (MSR) to determine whether the protected function module 122 is active. In block 404, the computing device 100 determines whether the protected function module 122 is active. If not, the method 400 branches ahead to block 414, described below. If active, the method 400 advances to block 406.

In block 406, the computing device 100 irreversibly modifies the modifiable security device 126 in response to the protected function module 122 being active. The computing device 100 may use any technique that produces an irreversible change to one or more attributes of the modifiable security device 126 that is persistent across power cycles.

In some embodiments, in block 408, the computing device 100 may provide power to an oscillator 126. In some embodiments, the oscillator 126 may be provided power by the security circuit 124 automatically whenever the protected function module 122 is powered. For example, the oscillator 126 may be embedded or incorporated in the protected function module 122 or otherwise connected to the power supply of the protected function module 122. When oscillators are powered, they experience a phenomenon known as oscillator aging. Oscillator aging causes the operating frequency of the oscillator 126 to change over time, or in some embodiments, cause the oscillator 126 to stop operating altogether. The change in frequency may not be reversed or altered and is thus not reversible by software, firmware, or other hardware of the computing device 100. Thus, the presence of a change in operating frequency indicates that the oscillator 126 has been powered.

In some embodiments, in block 410, the computing device 100 may blow one or more fuses 126. For example, the security circuit 124 may blow a fuse 126 whenever the protected function module 122 is powered. Blowing the fuse 126 causes a persistent open circuit that may be measured across power cycles. Because each fuse 126 may only be blown once, the computing device 100 may include several fuses 126, with each fuse 126 usable to indicate a discrete instance of powering the protected function module 122. Additionally or alternatively, it should be understood that in some embodiments, the computing device 100 may use any other device or technique to irreversibly connect or disconnect circuit components. For example, rather than blowing a fuse 126, the computing device 100 may set an antifuse 126, causing a persistent short circuit.

In some embodiments, in block 412 the computing device 100 may provide power to a circuit component 126 to cause leakage current of the component to increase. The circuit component 126 may be embodied as any circuit component or collection of circuit components that may leak a small amount of electrical current. The amount of current leaked increases with use of the circuit component 126. For example, the circuit component 126 may be embodied as a capacitor. Thus, the change in leakage current indicates that the circuit component 126 has been powered.

In block 414, the computing device 100 determines if the status of the modifiable security device 126 has been requested. In some embodiments, the computing device 100 may request the status of the modifiable security device 126 by reading a status register, memory address, or other storage location. Additionally or alternatively, in some embodiments the computing device 100 may continually determine the status of the modifiable security device 126 without an express read request. In block 416, the computing device 100 determines whether to determine the status of the modifiable security device 126. If not, the method 400 loops back to block 402 to continue monitoring the protected function module 122. If determining the status of the modifiable security device 126, the method 400 advances to block 418.

In block 418, the computing device 100 reads the status of the modifiable security device 126. The computing device 100 may make any measurement, test, sample, or other determination of an attribute of the modifiable security device 126. That attribute of the modifiable security device 126 indicates whether the modifiable security device 126 has been modified in response to activation of the protected function module 122. In some embodiments, in block 420 the computing device 100 may determine the operating frequency of an oscillator 126. As described above, when supplied with power, the operating frequency of the oscillator 126 may change due to oscillator aging. In some embodiments, in block 422 the computing device 100 may determine the state of one or more fuses 126, i.e., determine whether the fuses 126 have been blown. In some embodiments, in block 424 the computing device 100 may measure the leakage current of a circuit component 126. As described above, the leakage current may increase when the circuit component 126 has been powered up.

In block 426, the computing device 100 returns the status of the modifiable security device 126. The computing device 100 may return any data indicative of the status of the modifiable security device 126. The computing device 100 may use any technique to make the status data available. For example, the computing device 100 may make the status data available through access to a register, a memory location, or other storage location. The status data may be returned in any format. In some embodiments, the status data may be returned as raw data; for example, as data indicative of the operating frequency of an oscillator 126. Additionally or alternatively, in some embodiments the status data may be scaled, normalized, or otherwise processed to provide data indicative of whether an attribute of the modifiable security device 126 has been modified.

In some embodiments, in block 428 the computing device 100 may cryptographically sign the status data prior to returning the status data. The computing device 100 may use any cryptographic technique for signing the status data. In some embodiments, the computing device 100 may sign the status data using a device-specific encryption key or other verifiable signing technique. After being signed, remote computing devices may be able to confirm that the status data is authentic and/or has not been tampered with after being generated by the computing device 100. For example, a remote management console may monitor status data associated with the modifiable security devices 126 of several computing devices 100. After returning the status data, the method 400 loops back to block 402 to continue monitoring the protected function module 122.

EXAMPLES

Illustrative examples of the technologies disclosed herein are provided below. An embodiment of the technologies may include any one or more, and any combination of, the examples described below.

Example 1 includes an integrated circuit device for protected function monitoring, the integrated circuit device comprising a protected function module to provide a protected functionality to the integrated circuit device when active, wherein the protected function module includes a modifiable security device; and a security circuit to irreversibly modify an attribute of the modifiable security device in response to activation of the protected function module.

Example 2 includes the subject matter of Example 1, and wherein the protected function module comprises a debug module to provide a debug functionality when active.

Example 3 includes the subject matter of any of Examples 1 and 2, and wherein the protected function module is to provide a metering functionality when active.

Example 4 includes the subject matter of any of Examples 1-3, and wherein the modifiable security device comprises an oscillator; and to irreversibly modify the attribute of the modifiable security device comprises to provide power to the oscillator.

Example 5 includes the subject matter of any of Examples 1-4, and wherein the modifiable security device comprises a fuse; and to irreversibly modify the attribute of the modifiable security device comprises to blow the fuse.

Example 6 includes the subject matter of any of Examples 1-5, and wherein the modifiable security device comprises a circuit component; and to irreversibly modify the attribute of the modifiable security device comprises to provide power to the circuit component to cause a leakage current of the circuit component to increase.

Example 7 includes the subject matter of any of Examples 1-6, and wherein the integrated circuit device comprises a processor.

Example 8 includes the subject matter of any of Examples 1-7, and wherein the integrated circuit device comprises a processor; the protected function module comprises a debug module to provide a debug functionality when active; the modifiable security device comprises an oscillator; and to irreversibly modify the attribute of the modifiable security device comprises to provide power to the oscillator.

Example 9 includes the subject matter of any of Examples 1-8, and further comprising a firmware interface module to read data indicative of a status of the modifiable security device in response to a status request.

Example 10 includes the subject matter of any of Examples 1-9, and wherein the modifiable security device comprises an oscillator; and to read the data indicative of the status of the modifiable security device comprises to determine an operating frequency of the oscillator.

Example 11 includes the subject matter of any of Examples 1-10, and wherein the modifiable security device comprises a fuse; and to read the data indicative of the status of the modifiable security device comprises to determine a state of the fuse.

Example 12 includes the subject matter of any of Examples 1-11, and wherein the modifiable security device comprises a circuit component; and to read the data indicative of the status of the modifiable security device comprises to determine a leakage current of the circuit component.

Example 13 includes the subject matter of any of Examples 1-12, and wherein the firmware interface module is further to cryptographically sign the data indicative of the status of the modifiable security device; and return the cryptographically signed data indicative of the status of the modifiable security device in response to the status request.

Example 14 includes the subject matter of any of Examples 1-13, and wherein to return the cryptographically signed data indicative of the status comprises to establish a firmware-readable memory space including the cryptographically signed data indicative of the status of the modifiable security device.

Example 15 includes the subject matter of any of Examples 1-14, and wherein the integrated circuit device is included in a computing device.

Example 16 includes a method for protected function monitoring, the method comprising determining, by a computing device, whether a protected function module of an integrated circuit device of the computing device is active, wherein the protected function module provides a protected functionality to the integrated circuit device when active; and irreversibly modifying, by the computing device, an attribute of a modifiable security device embedded in the integrated circuit device in response to the protected function module of the integrated circuit device being active.

Example 17 includes the subject matter of Example 16, and wherein the protected function module provides a debug functionality when active.

Example 18 includes the subject matter of any of Examples 16 and 17, and wherein the protected function module provides a metering functionality when active.

Example 19 includes the subject matter of any of Examples 16-18, and wherein irreversibly modifying the attribute of a modifiable security device comprises providing power to an oscillator of the computing device.

Example 20 includes the subject matter of any of Examples 16-19, and wherein irreversibly modifying the attribute of a modifiable security device comprises blowing a fuse of the computing device.

Example 21 includes the subject matter of any of Examples 16-20, and wherein irreversibly modifying the attribute of a modifiable security device comprises providing power to a circuit component of the computing device to cause a leakage current of the circuit component to increase.

Example 22 includes the subject matter of any of Examples 16-21, and wherein the integrated circuit device comprises a processor.

Example 23 includes the subject matter of any of Examples 16-22, and wherein the integrated circuit device comprises a processor; the protected function module comprises a debug module to provide a debug functionality when active; the modifiable security device comprises an oscillator included in the protected function module; and irreversibly modifying the attribute of a modifiable security device comprises providing power to the oscillator.

Example 24 includes the subject matter of any of Examples 16-23, and further comprising reading, by the computing device, data indicative of a status of the modifiable security device in response to a status request.

Example 25 includes the subject matter of any of Examples 16-24, and wherein reading the data indicative of the status of the modifiable security device comprises determining an operating frequency of an oscillator of the protected function module.

Example 26 includes the subject matter of any of Examples 16-25, and wherein reading the data indicative of the status of the modifiable security device comprises determining a state of a fuse of the computing device.

Example 27 includes the subject matter of any of Examples 16-26, and wherein reading the data indicative of the status of the modifiable security device comprises determining a leakage current of a circuit component of the computing device.

Example 28 includes the subject matter of any of Examples 16-27, and further comprising cryptographically signing, by the computing device, the data indicative of the status of the modifiable security device; and returning, by the computing device, the cryptographically signed data indicative of the status of the modifiable security device in response to the status request.

Example 29 includes the subject matter of any of Examples 16-28, and wherein returning the cryptographically signed data indicative of the status comprises establishing a firmware-readable memory space including the cryptographically signed data indicative of the status of the modifiable security device.

Example 30 includes a computing device comprising a processor; and a memory having stored therein a plurality of instructions that when executed by the processor cause the computing device to perform the method of any of Examples 16-29.

Example 31 includes one or more machine readable storage media comprising a plurality of instructions stored thereon that in response to being executed result in a computing device performing the method of any of Examples 16-29.

Example 32 includes a computing device comprising means for performing the method of any of Examples 16-29.

Example 33 includes a computing device for protected function monitoring, the computing device comprising means for determining whether a protected function module of an integrated circuit device of the computing device is active, wherein the protected function module provides a protected functionality to the integrated circuit device when active; and means for irreversibly modifying an attribute of a modifiable security device embedded in the integrated circuit device in response to the protected function module of the integrated circuit device being active.

Example 34 includes the subject matter of Example 33, and wherein the protected function module provides a debug functionality when active.

Example 35 includes the subject matter of any of Examples 33 and 34, and wherein the protected function module provides a metering functionality when active.

Example 36 includes the subject matter of any of Examples 33-35, and wherein the means for irreversibly modifying the attribute of a modifiable security device comprises means for providing power to an oscillator of the computing device.

Example 37 includes the subject matter of any of Examples 33-36, and wherein the means for irreversibly modifying the attribute of a modifiable security device comprises means for blowing a fuse of the computing device.

Example 38 includes the subject matter of any of Examples 33-37, and wherein the means for irreversibly modifying the attribute of a modifiable security device comprises means for providing power to a circuit component of the computing device to cause a leakage current of the circuit component to increase.

Example 39 includes the subject matter of any of Examples 33-38, and wherein the integrated circuit device comprises a processor.

Example 40 includes the subject matter of any of Examples 33-39, and wherein the integrated circuit device comprises a processor; the protected function module comprises a debug module to provide a debug functionality when active; the modifiable security device comprises an oscillator included in the protected function module; and the means for irreversibly modifying the attribute of a modifiable security device comprises means for providing power to the oscillator.

Example 41 includes the subject matter of any of Examples 33-40, and further comprising means for reading data indicative of a status of the modifiable security device in response to a status request.

Example 42 includes the subject matter of any of Examples 33-41, and wherein the means for reading the data indicative of the status of the modifiable security device comprises means for determining an operating frequency of an oscillator of the protected function module.

Example 43 includes the subject matter of any of Examples 33-42, and wherein the means for reading the data indicative of the status of the modifiable security device comprises means for determining a state of a fuse of the computing device.

Example 44 includes the subject matter of any of Examples 33-43, and wherein the means for reading the data indicative of the status of the modifiable security device comprises means for determining a leakage current of a circuit component of the computing device.

Example 45 includes the subject matter of any of Examples 33-44, and further comprising means for cryptographically signing the data indicative of the status of the modifiable security device; and means for returning the cryptographically signed data indicative of the status of the modifiable security device in response to the status request.

Example 46 includes the subject matter of any of Examples 33-45, and wherein the means for returning the cryptographically signed data indicative of the status comprises means for establishing a firmware-readable memory space including the cryptographically signed data indicative of the status of the modifiable security device.

The invention claimed is:

1. An integrated circuit device for protected function monitoring, the integrated circuit device comprising:
   a protected function module to provide a protected functionality to the integrated circuit device when power is received at the protected function module, wherein the protected function module includes a modifiable security device that includes an oscillator and a flooring circuit to floor an output of the oscillator after a frequency of the oscillator has drifted by a threshold amount; and
   a security circuit to irreversibly modify an attribute of the modifiable security device in response to receipt of the power at the protected function module.

2. The integrated circuit device of claim 1, wherein the protected function module comprises a debug module to provide a debug functionality when the power is received at the protected function module.

3. The integrated circuit device of claim 1, wherein:
   the modifiable security device further comprises a fuse; and
   to irreversibly modify the attribute of the modifiable security device comprises to blow the fuse.

4. The integrated circuit device of claim 1, wherein:
   the modifiable security device further comprises a circuit component; and
   to irreversibly modify the attribute of the modifiable security device comprises to provide power to the circuit component to cause a leakage current of the circuit component to increase.

5. The integrated circuit device of claim 1, wherein:
   the integrated circuit device comprises a processor;
   the protected function module comprises a debug module to provide a debug functionality when active; and
   to irreversibly modify the attribute of the modifiable security device comprises to provide power to the oscillator.

6. The integrated circuit device of claim 1, further comprising a firmware interface module to read data indicative of a status of the modifiable security device in response to a status request.

7. The integrated circuit device of claim 6, wherein:
   to read the data indicative of the status of the modifiable security device comprises to determine the frequency of the oscillator.

8. The integrated circuit device of claim 6, wherein:
   the modifiable security device further comprises a fuse; and
   to read the data indicative of the status of the modifiable security device comprises to determine a state of the fuse.

9. The integrated circuit device of claim 6, wherein:
the modifiable security device further comprises a circuit component; and
to read the data indicative of the status of the modifiable security device comprises to determine a leakage current of the circuit component.

10. The integrated circuit device of claim 6, wherein the firmware interface module is further to:
cryptographically sign the data indicative of the status of the modifiable security device; and
return the cryptographically signed data indicative of the status of the modifiable security device in response to the status request.

11. The integrated circuit device of claim 10, wherein to return the cryptographically signed data indicative of the status comprises to establish a firmware-readable memory space including the cryptographically signed data indicative of the status of the modifiable security device.

12. The integrated circuit device of claim 1, wherein the integrated circuit device is included in a computing device.

13. A method for protected function monitoring, the method comprising:
determining, by a computing device, whether a protected function module of an integrated circuit device of the computing device is receiving power, wherein the protected function module provides a protected functionality to the integrated circuit device when receiving power; and
irreversibly modifying, by the computing device and in response to the protected function module of the integrated circuit device receiving power, an attribute of a modifiable security device that includes an oscillator and a flooring circuit to floor an output of the oscillator after a frequency of the oscillator has drifted by a threshold amount, wherein the modifiable security device is embedded in the integrated circuit device.

14. The method of claim 13, wherein:
the integrated circuit device comprises a processor;
the protected function module comprises a debug module to provide a debug functionality when the protected function module is receiving power;
and
irreversibly modifying the attribute of a modifiable security device comprises providing power to the oscillator.

15. The method of claim 13, further comprising:
reading, by the computing device, data indicative of a status of the modifiable security device in response to a status request.

16. The method of claim 15, wherein reading the data indicative of the status of the modifiable security device comprises determining the frequency of the oscillator.

17. The method of claim 15, further comprising:
cryptographically signing, by the computing device, the data indicative of the status of the modifiable security device; and
returning, by the computing device, the cryptographically signed data indicative of the status of the modifiable security device in response to the status request.

18. The method of claim 17, wherein returning the cryptographically signed data indicative of the status comprises establishing a firmware-readable memory space including the cryptographically signed data indicative of the status of the modifiable security device.

19. One or more non-transitory, computer-readable storage media comprising a plurality of instructions that in response to being executed cause a computing device to:
determine whether a protected function module of an integrated circuit device of the computing device is receiving power, wherein the protected function module provides a protected functionality to the integrated circuit device when receiving power; and
irreversibly modify, in response to the protected function module of the integrated circuit device receiving power, an attribute of a modifiable security device that includes an oscillator and a flooring circuit to floor an output of the oscillator after a frequency of the oscillator has drifted by a threshold amount, wherein the modifiable security device is embedded in the integrated circuit device.

20. The one or more non-transitory, computer-readable storage media of claim 19, wherein:
the integrated circuit device comprises a processor;
the protected function module comprises a debug module to provide a debug functionality when the protected function module is receiving power;
and
to irreversibly modify the attribute of a modifiable security device comprises to provide power to the oscillator.

21. The one or more non-transitory, computer-readable storage media of claim 19, further comprising a plurality of instructions that in response to being executed cause the computing device to:
read data indicative of a status of the modifiable security device in response to a status request.

22. The one or more non-transitory, computer-readable storage media of claim 21, wherein to read the data indicative of the status of the modifiable security device comprises to determine the frequency of the oscillator.

23. The one or more non-transitory, computer-readable storage media of claim 21, further comprising plurality of instructions that in response to being executed cause the computing device to:
cryptographically sign the data indicative of the status of the modifiable security device; and
return the cryptographically signed data indicative of the status of the modifiable security device in response to the status request.

* * * * *